United States Patent
Pivovar et al.

(10) Patent No.: US 7,582,683 B2
(45) Date of Patent: Sep. 1, 2009

(54) ANION-CONDUCTING POLYMER, COMPOSITION, AND MEMBRANE

(75) Inventors: Bryan S. Pivovar, Los Alamos, NM (US); David L. Thorn, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 12/283,143

(22) Filed: Sep. 4, 2008

(65) Prior Publication Data

US 2009/0023845 A1 Jan. 22, 2009

Related U.S. Application Data

(62) Division of application No. 11/387,310, filed on Mar. 22, 2006, now Pat. No. 7,439,275.

(60) Provisional application No. 60/664,808, filed on Mar. 24, 2005.

(51) Int. Cl.
*C08J 5/20* (2006.01)
*C08G 75/00* (2006.01)
*C08G 79/00* (2006.01)
*C08G 79/02* (2006.01)

(52) U.S. Cl. .............. 521/25; 521/27; 528/86; 528/167; 528/168; 528/169; 528/373; 528/397; 528/398; 528/399

(58) Field of Classification Search ............ 521/25, 521/27; 528/86, 167, 168, 169, 373, 397, 528/398, 399
See application file for complete search history.

(56) References Cited

OTHER PUBLICATIONS

Neagu et al., "Ionic Polymers VI. Chemical Stability of Strong Base Anion Exchangers in Aggressive Media," Polymer Degradation and Stability, vol. 70, Dec. 2000, pp. 463-468.
Varcoe et al., "Prospects for Alkaline Anion-Exchange Membranes In Low Temperature Fuel Cells," Fuel Cells, vol. 4, No. 4, Dec. 2004, pp. 1-14.
Becker et al., "New Organic Electrolytes: Tris(dialkylamino)sulfonium salts: $(R_2N)_3S^+X^-$," Journal of Electroanalytical Chem., vol. 248, Jul. 1988, pp. 363-368.
Hartmann et al., "Chrystal Chemistry of Uncharged Phosphazene Bases,I. Structures of Two Hydrates and Acetate of Tris(dimethylamino)methyliminophosphorane," Zeitschrift fur Naturforschung Section B, 51b, Oct. 1996, pp. 1369-1374.
Hartmann et al., "Crystal Chemistry of Uncharged Phosphazene Bases, II. Structures of the Anhydrous Form and Two Hydrates of the Diphosphazene $(Me(2)N)(3)P=N-(Me(2)N)(2)P=NH$," Zeitschrift fur Naturforschung Section B, 51b, Oct. 1996, p. 1375-1380.
Zhou et al., "High Temperature Transport Properties of Polyphosphazene Membranes for Direct Methanol Fuel Cells," Electrochim. Acta 48, Jun. 2003, pp. 2173-2180.
Schwesinger et al., "Extremely Strong, Uncharged Auxiliary Bases; Monomeric and Polymer-Supported Polyaminophosphazenes (P-2-P-5)," Liebigs Annalen, Jul. 1996, vol. 7, pp. 1005-1081.

*Primary Examiner*—Duc Truong
(74) *Attorney, Agent, or Firm*—Samuel L. Borowsky

(57) ABSTRACT

Anion-conducing polymers and membranes with enhanced stability to aqueous alkali include a polymer backbone with attached sulfonium, phosphazenium, phosphazene, and guanidinium residues. Compositions also with enhanced stability to aqueous alkali include a support embedded with sulfonium, phosphazenium, and guanidinium salts.

3 Claims, No Drawings

ANION-CONDUCTING POLYMER, COMPOSITION, AND MEMBRANE

RELATED CASES

This application is a divisional of U.S. patent application Ser. No. 11/387,310 filed Mar. 22, 2006, now U.S. Pat. No. 7,439,275, and claims the benefit of U.S. Provisional Patent Application Ser. No. 60/664,808 filed on Mar. 24, 2005, all incorporated by reference herein.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to membranes and more particularly to anion-conducting polymers, compositions, and membranes for fuel cells, electrolyzers, and other chemical or electrochemical applications.

BACKGROUND OF THE INVENTION

An electronically non-conducting, ion-conducting medium is an essential part of fuel cells and electrolyzers, can be used in separations and ion exchange, and is also important for other electrochemical applications. Liquids can serve as the ion-conducting medium but there are practical difficulties with the use of liquids and it is highly advantageous to use ion-conducting membranes instead of liquids for electrochemical applications. In all fuel cells and electrolyzers where water is involved, the fundamental reactions require either a proton-conducting membrane or anion-conducting membrane. Of the two, proton-conducting membranes, which operate in acidic media, offer the required combination of adequate longevity and good conductivity at near ambient temperature (25-100 degrees Celsius).

The aqueous reduction chemistry that takes place in acidic media is summarized by the equation

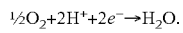
$\frac{1}{2}O_2 + 2H^+ + 2e^- \rightarrow H_2O$.

Precious metals such as platinum and platinum alloy catalysts are used as electrocatalysts in acidic media because they are relatively unreactive with strong acids and can perform the needed electrocatalytic oxidation and reduction chemistry in acid media. However, the above reduction reaction is relatively slow using a platinum catalyst and requires an overpotential on the order of about 0.3 to 0.5 volts to drive the reaction at a useful rate.

While fuel cells and electrolyzers employing acidic electrolytes require proton-conducting membranes, those employing alkaline electrolytes require anion-conducting (hydroxide-conducting, in particular) membranes. The aqueous reduction chemistry that takes place in alkaline media is summarized by the equation

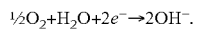
$\frac{1}{2}O_2 + H_2O + 2e^- \rightarrow 2OH^-$.

This reduction reaction is relatively rapid compared to the previous reaction and requires a smaller overpotential (about 0.2-0.4 volts) to drive the reaction at a useful rate, which also results in producing less waste heat for removal. Besides the increased efficiency of the oxygen reduction reaction, the expensive noble metal catalysts that are required for proton-conducting systems could be replaced with inexpensive base metal catalysts such as nickel.

Attempts have been made at identifying and developing materials useful for hydroxide-conducting membranes. Examples of these materials include cationic polymers with tetraalkylammonium and N-alkylpyridinium side chains and mobile hydroxide counterions. The chemical stability of these polymers has been reported in "Ionic Polymers VI. Chemical Stability of Strong Base Anion Exchangers in Aggressive Media," Polymer Degradation and Stability, vol. 70 (2000) pp. 463-468, incorporated by reference herein. According to this paper, exposing these polymers to concentrated alkali results in chemical degradation of the side chains. Some of the degradation chemistry for one of these polymers in concentrated alkali is shown SCHEME 1 below.

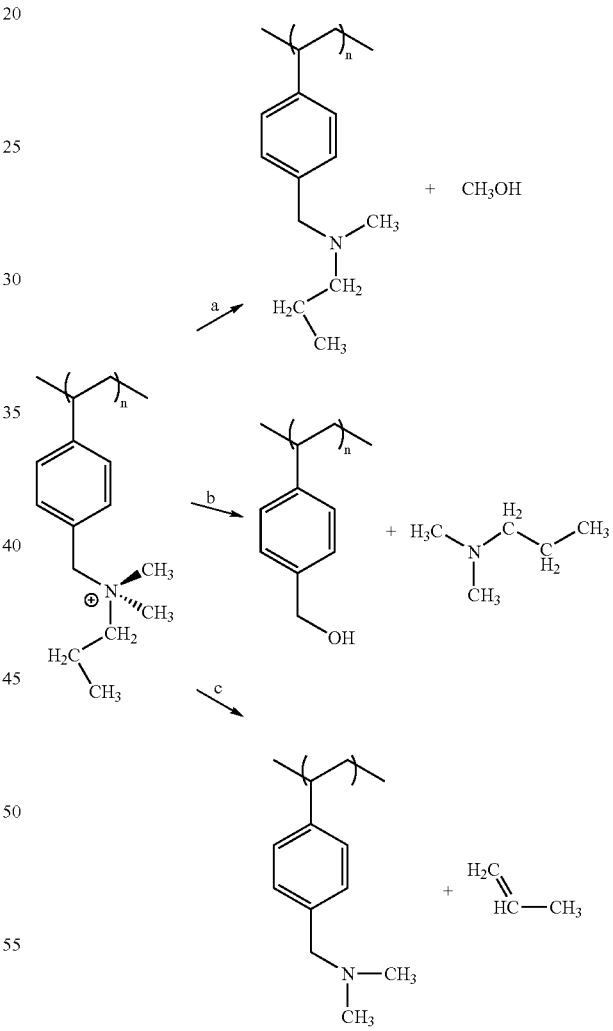

Pathway 'a' of SCHEME 1 shows polymer degradation by demethylation of the starting cationic polymer. This pathway produces a neutral polymer with an amine side chain and a molecule of methanol. Pathway 'b' shows a degradation that generates polymer with a benzylic alcohol side chain; a molecule of a neutral amine is also released. Pathway c shows a beta-elimination degradation. The beta-elimination of the starting cationic polymer results in the production of a neutral polymer with an amine side chain. An olefin molecule is also produced.

The use of anionic-conducting membranes for fuel cells has been reviewed by Varcoe et al. in "Prospects for Alkaline Anion-Exchange Membranes in Low Temperature Fuel Cells," Fuel Cells, vol. 4, no. 4 (2004), pp. 1-14, incorporated by reference herein. According to this paper, anion-conducting membranes suffer from performance loss when they are used in the air. While the reasons for the loss in performance are not fully understood, it is believed that the degradation of the polymer and the formation of carbonates play an important role.

Anion-conducting membranes, hydroxide-conducting membranes in particular, that are chemically stable, highly conducting, and not significantly affected by degradation or by the formation of carbonates remain desirable.

Therefore, an object of the present invention is an anion-conducting membrane that is more stable to chemical degradation at high pH than currently available anion exchange membranes.

Another object of the present invention is a polymer that may be used to prepare a robust anion-conducting membrane.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a polymeric reaction product of the reaction of at least one compound having the structure

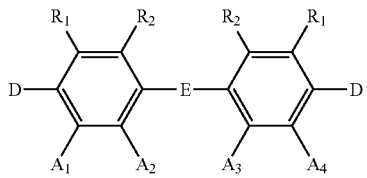

with at least one compound having the structure

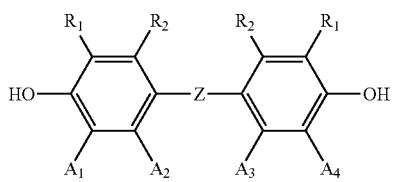

wherein D is halide selected from F, Cl, Br, and I;
wherein E is selected from —$SO_2$—, —C(=O)—, and —P(=O)(aryl)-;
wherein Z is a direct bond or —$C(CX_3)_2$— where X is hydrogen or fluorine;

wherein $R_1$ and $R_2$ independently of one another denote H, an alkyl, cycloalkyl, alkenyl, aryl, or aralkyl group having 1 to 10 carbon atoms or a heterocyclic group having 4 to 20 carbon atoms;

wherein $R_1$ and $R_2$ may together form a —$(CH_2)_2$—, —$(CH_2)_3$—, —$(CH_2)_4$—, —$(CH_2)_5$—, —CH=CH—, or —CH=CH—CH=CH—;

wherein $A_1$, $A_2$, $A_3$, and $A_4$ are independently selected from hydrogen, alkyl, cycloalkyl, alkenyl, aryl, aralkyl having 1 to 10 carbon atoms, a heterocyclic group having 4 to 20 carbon atoms, and a residue of the formula

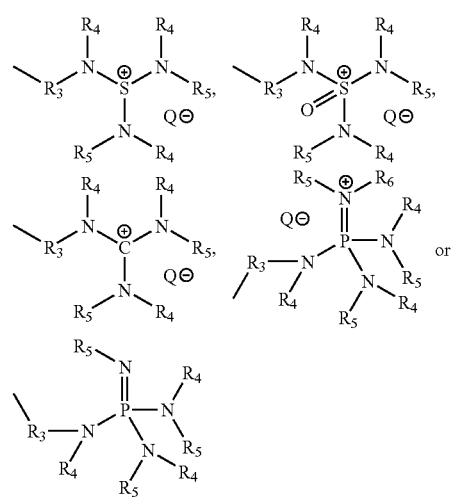

wherein $R_3$ is a direct bond or a group selected from —$(CH_2CH_2)$—, —$(C_6H_4)$—, —$(CF_2CF_2)$—, —$(CH_2CH_2CH_2)$—; wherein $R_4$ and $R_5$ independently of one another denote an alkyl, cycloalkyl, alkenyl, aryl, or aralkyl group having 1 to 10 carbon atoms or a heterocyclic group having 4 to 20 carbon atoms; wherein $R_4$ and $R_5$ may together form a —$(CH_2)_2$—, —$(CH_2)_3$—, —$(CH_2)_4$—, —$(CH_2)_5$—, —CH=CH—, or —CH=CH—CH=CH—; wherein $R_6$ is selected from the group consisting of H, alkyl, cycloalkyl; wherein Q is any anion; and with the caveat that the polymeric reaction product is prepared from monomer having at least 5 mole percent of the residue.

The invention also includes a composition of a support and a salt embedded in the support, the salt being selected from the group consisting of

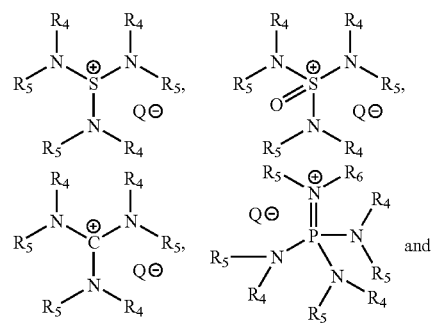

and

-continued

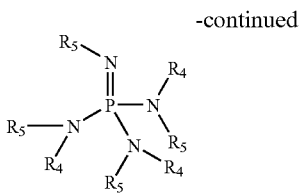

wherein $R_4$ and $R_5$ independently of one another denote an alkyl, cycloalkyl, alkenyl, aryl, or aralkyl group having 1 to 10 carbon atoms or a heterocyclic group having 4 to 20 carbon atoms; wherein $R_4$ and $R_5$ may together form a —$(CH_2)_2$—, —$(CH_2)_3$—, —$(CH_2)_4$—, —$(CH_2)_5$—, —CH=CH—, or —CH=CH—CH=CH—; wherein $R_6$ is selected from H, alkyl, cycloalkyl; and wherein Q is any anion. The invention also includes a membrane prepared using this composition.

The invention also includes a polymer having the structure

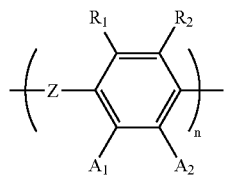

wherein Z is a direct bond or a chemical group independently selected from —O—, —S—, —$SO_2$—, —$C(CH_3)_2$—, —$C(CF_3)_2$—, —C(=O)—, —P(=O)(aryl)-, phenyl; wherein $R_1$ and $R_2$ independently of one another denote H, an alkyl, cycloalkyl, alkenyl, aryl, or aralkyl group having 1 to 10 carbon atoms or a heterocyclic group having 4 to 20 carbon atoms; wherein $R_1$ and $R_2$ together may form a —$(CH_2)_2$—, —$(CH_2)_3$—, —$(CH_2)_4$—, —$(CH_2)_5$—, —CH=CH—, or —CH=CH—CH=CH—; and wherein $A_1$ and $A_2$ are selected from hydrogen, alkyl, cycloalkyl, alkenyl, aryl, aralkyl group having 1 to 10 carbon atoms, a heterocyclic group having 4 to 20 carbon atoms, and a residue selected from those of the formula

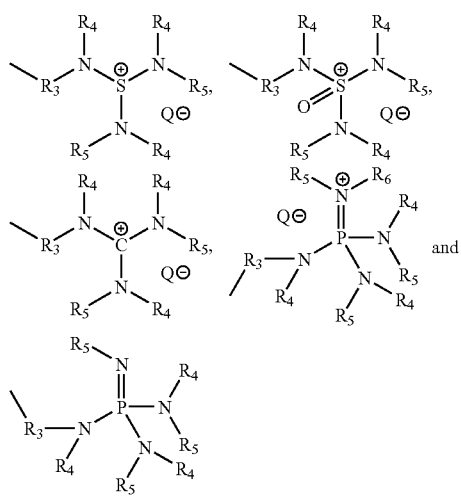

wherein $R_3$ is a direct bond or a group selected from —$(CH_2CH_2)$—, —$(C_6H_4)$—, —$(CF_2CF_2)$—, —$(CH_2CH_2CH_2)$—; wherein $R_4$ and $R_5$ independently of one another denote an alkyl, cycloalkyl, alkenyl, aryl, or aralkyl group having 1 to 10 carbon atoms or a heterocyclic group having 4 to 20 carbon atoms; wherein $R_4$ and $R_5$ may together form a —$(CH_2)_2$—, —$(CH_2)_3$—, —$(CH_2)_4$—, —$(CH_2)_5$—, —CH=CH—, or —CH=CH—CH=CH—; wherein $R_6$ is selected from H, alkyl or cycloalkyl; wherein Q is any anion; and with the caveat that the polymer has at least 1 weight percent of the residue.

The invention also includes a polymer of the formula

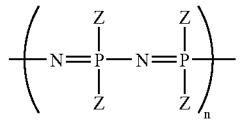

wherein n is any integer greater than 1; wherein Z is $NR_1R_2$ or $N(=PZ_3)$; and wherein $R_1$ and $R_2$ are independently selected from $C_1$ to $C_{10}$ alkyl, $C_1$ to $C_{10}$ partially fluorinated alkyl, or $C_1$ to $C_{10}$ fluorinated alkyl, and also wherein $R_1$ and $R_2$ may together form a —$(CH_2)_2$—, —$(CH_2)_3$—, —$(CH_2)_4$—, —$(CH_2)_5$—, —CH=CH—, or —CH=CH—CH=CH—.

DETAILED DESCRIPTION

The present invention is concerned with polymers and anion-conducting (hydroxide- and/or carbonate-conducting, in particular) membranes. Polymers of this invention may be prepared, for example, by condensation polymerization by reacting a compound of the formula

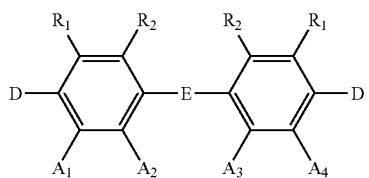

with at least one compound of the formula

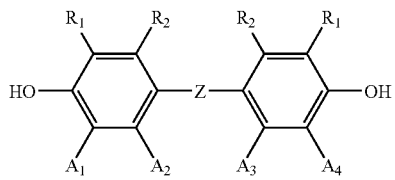

wherein D is halide selected from F, Cl, Br, and I;

wherein E is selected from —$SO_2$—, —C(=O)—, and —P(=O)(aryl)-;

wherein Z is a direct bond or —$C(CX_3)_2$— where X is hydrogen or fluorine;

wherein $R_1$ and $R_2$ independently of one another denote H, an alkyl, cycloalkyl, alkenyl, aryl, or aralkyl group having 1 to 10 carbon atoms or a heterocyclic group having 4 to 20 carbon atoms; wherein $R_1$ and $R_2$ may together form a —$(CH_2)_2$—, —$(CH_2)_3$—, —$(CH_2)_4$—, —$(CH_2)_5$—, —CH=CH—, or —CH=CH—CH=CH—;

wherein $A_1$, $A_2$, $A_3$, and $A_4$ are independently selected from hydrogen, alkyl, cycloalkyl, alkenyl, aryl, aralkyl having 1 to 10 carbon atoms, a heterocyclic group having 4 to 20 carbon atoms, and a residue of the formula

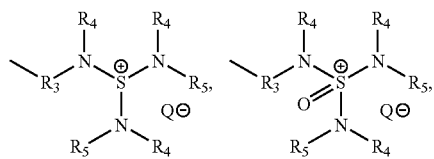

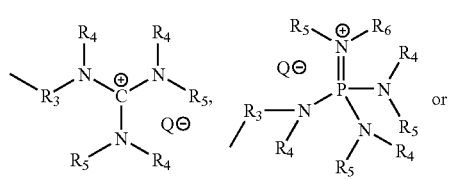

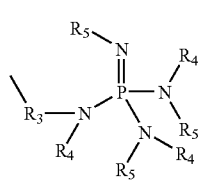

wherein $R_3$ is a direct bond or a group selected from —(CH$_2$CH$_2$)—, —(C$_6$H$_4$)—, —(CF$_2$CF$_2$)—, —(CH$_2$CH$_2$CH$_2$)—; wherein $R_4$ and $R_5$ independently of one another denote an alkyl, cycloalkyl, alkenyl, aryl, or aralkyl group having 1 to 10 carbon atoms or a heterocyclic group having 4 to 20 carbon atoms; wherein $R_4$ and $R_5$ may together form a —(CH$_2$)$_2$—, —(CH$_2$)$_3$—, —(CH$_2$)$_4$—, —(CH$_2$)$_5$—, —CH=CH—, or —CH=CH—CH=CH—; wherein $R_6$ is selected from H, alkyl, cycloalkyl; and with the caveat that the polymeric reaction product is prepared from monomer having at least 5 mole percent of the residue. In other words, polymers of this invention must include one or more of these residues. Exemplary monomers that are useful for preparing polymers and membranes by a condensation polymerization reaction according to this invention include, but are not limited to

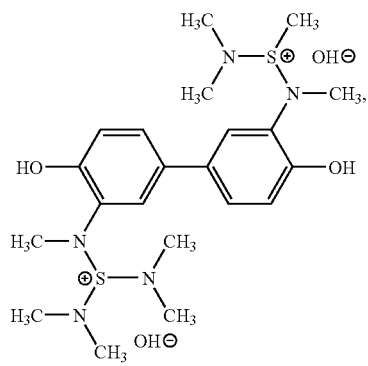

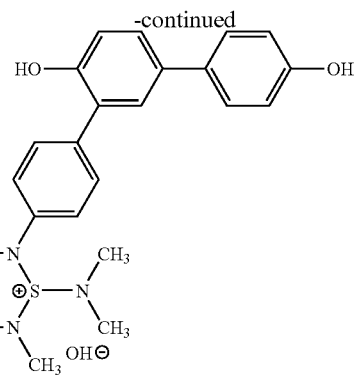

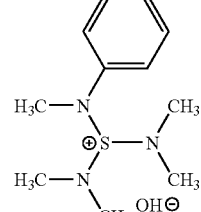

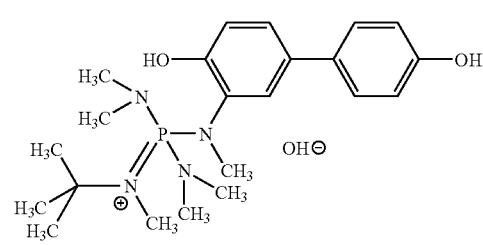

and

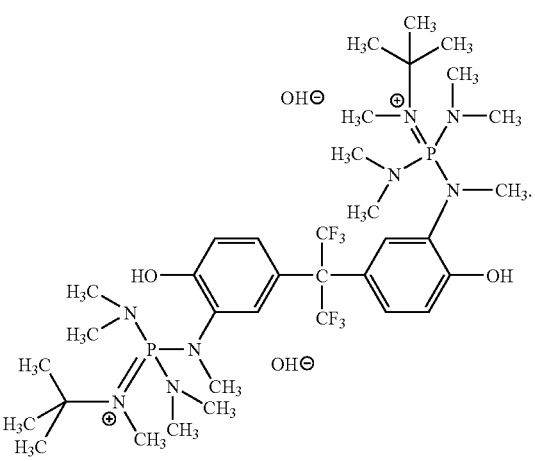

Polymers of this invention are also those having the formula

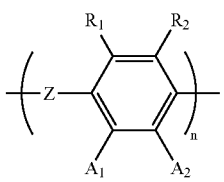

wherein n is an integer of 3 or greater; wherein Z is a direct bond or a chemical group independently selected from —O—, —S—, —SO$_2$—, —C(CH$_3$)$_2$—, —C(CF$_3$)$_2$—, —C(=O)—, —P(=O)(aryl)-, phenyl; wherein $R_1$ and $R_2$ independently of one another denote H, an alkyl, cycloalkyl, alkenyl, aryl, or aralkyl group having 1 to 10 carbon atoms or a heterocyclic group having 4 to 20 carbon atoms; wherein $R_1$ and $R_2$ together may form a —$(CH_2)_2$—, —$(CH_2)_3$—, —$(CH_2)_4$—, —$(CH_2)_5$—, —CH=CH—, or —CH=CH—CH=CH—; and wherein $A_1$ and $A_2$ are selected from hydrogen, alkyl, cycloalkyl, alkenyl, aryl, aralkyl group having 1 to 10 carbon atoms, a heterocyclic group having 4 to 20 carbon atoms, and a residue selected from those of the formula

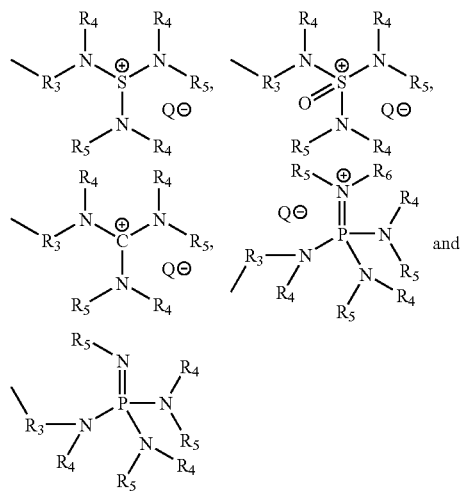

wherein $R_3$ is a direct bond or a group selected from —$(CH_2CH_2)$—, —$(C_6H_4)$—, —$(CF_2CF_2)$—, —$(CH_2CH_2CH_2)$—; wherein $R_4$ and $R_5$ independently of one another denote an alkyl, cycloalkyl, alkenyl, aryl, or aralkyl group having 1 to 10 carbon atoms or a heterocyclic group having 4 to 20 carbon atoms; wherein $R_4$ and $R_5$ may together form a —$(CH_2)_2$—, —$(CH_2)_3$—, —$(CH_2)_4$—, —$(CH_2)_5$—, —CH=CH—, or —CH=CH—CH=CH—; wherein $R_6$ is selected from H, alkyl or cycloalkyl; and with the caveat that the polymer has at least 1 weight percent of the residue. Preferred anions are hydroxide, carbonate, bicarbonate, and halide. If Q is monovalent such as hydroxide or halide, then the polymer should include one hydroxide for every cationic side chain. If Q is a divalent anion such as carbonate, then the polymer should include one carbonate anion for every two cationic side chains. Polymers with these structures may be prepared by attaching a cationic side chain to a polymer backbone. One possible synthetic scheme is shown in SCHEME 2 below.

SCHEME 2

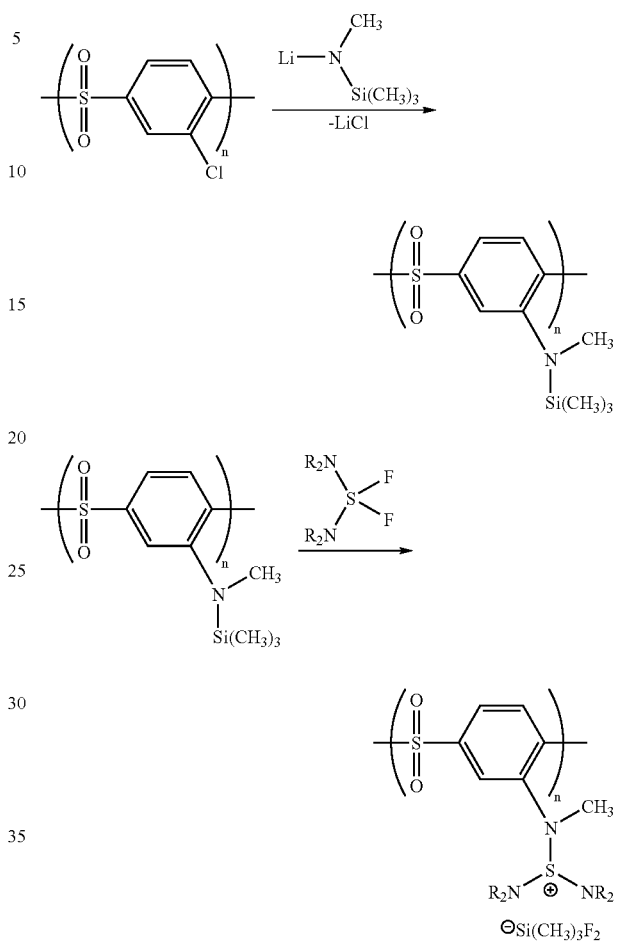

According to this exemplary scheme, poly(3-chlorophenylsulfone) is reacted with lithium trimethylsilylmethylamide, as shown in the first equation, and the reaction product is then reacted with the bis(dialkylamino) adduct of difluorosulfide to produce an exemplary invention polymer. Polymers prepared according to this type of scheme may have portions with structures such as

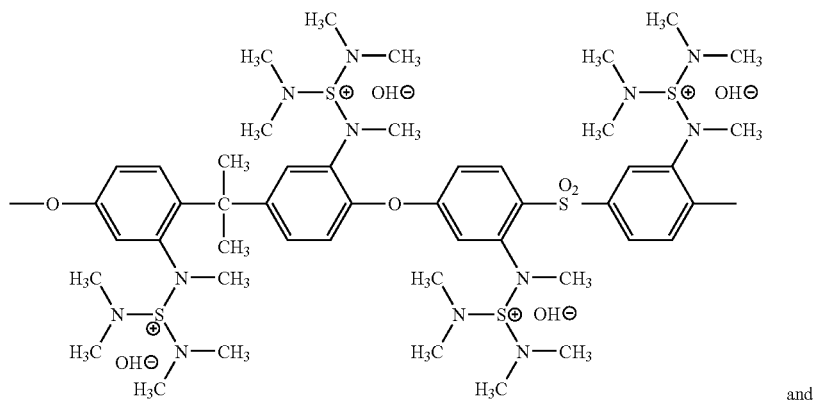

and

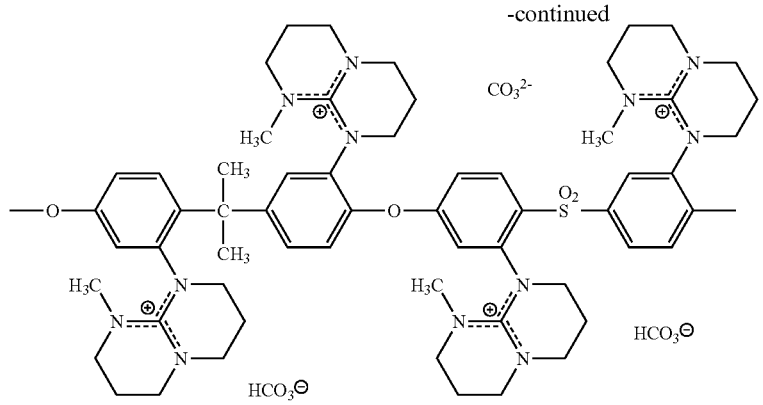
Other portions may include structures such as
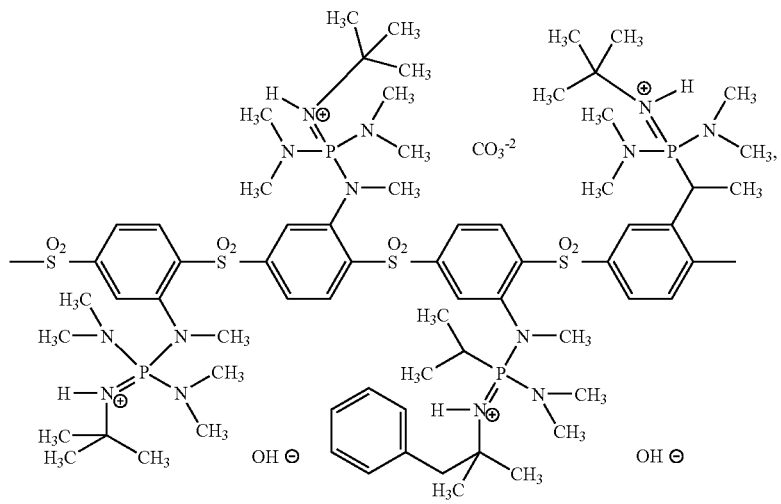
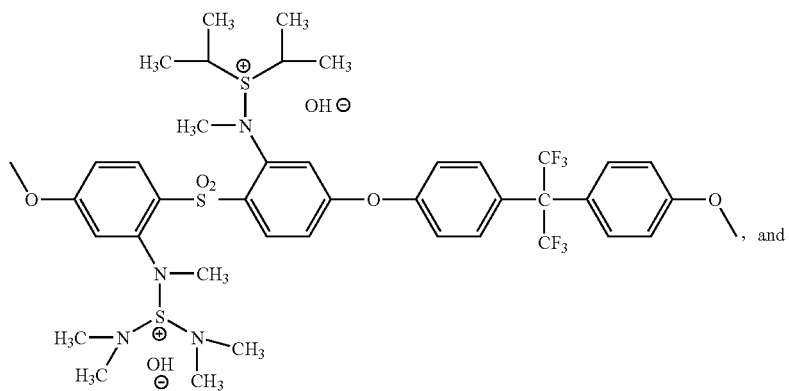, and -continued

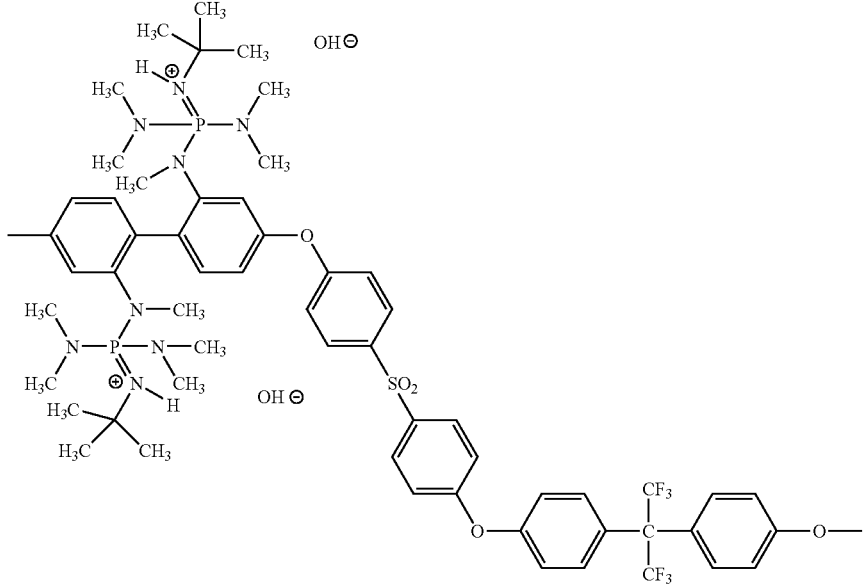

It should be understood that these structures are only illustrative of the many possible structures within the scope of this invention.

The invention is also related to compositions that include supports embedded with one or more salts having the structures

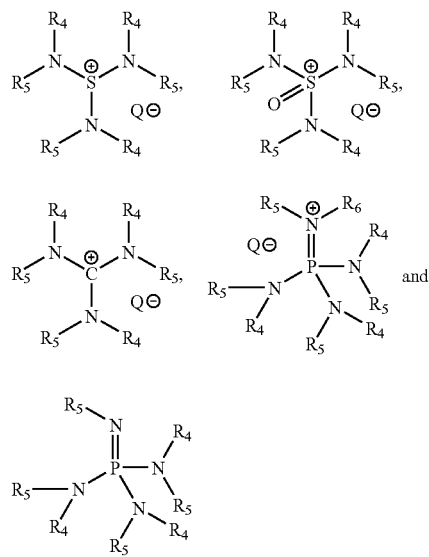

wherein $R_4$ and $R_5$ independently of one another denote an alkyl, cycloalkyl, alkenyl, aryl, or aralkyl group having 1 to 10 carbon atoms or a heterocyclic group having 4 to 20 carbon atoms; wherein $R_4$ and $R_5$ may together form a —$(CH_2)_2$—, —$(CH_2)_3$—, —$(CH_2)_4$—, —$(CH_2)_5$—, —CH=CH—, or —CH=CH—CH=CH—; wherein $R_6$ is selected from H, alkyl, cycloalkyl; and wherein Q is a monovalent, divalent, or trivalent anion. The invention also includes a membrane prepared using this composition. Preferred anions are hydroxide, carbonate, bicarbonate, and halide. If Q is monovalent such as hydroxide or halide, then there should be one cation for every hydroxide. If Q is a divalent anion such as carbonate, then there should be two cations for every carbonate. Compositions of this invention may be prepared by embedding polysulfones, polyamides, polyamines, polyalcohols, polybenzimidazoles, polyolefins, and the like with these salts. Other supports that include, but are not limited to, fiberglass and asbestos may also be used.

Polymers and compositions of this invention, and membranes prepared using these polymers and compositions, are used in an aqueous alkali medium. An exemplary salt, tris (piperidino)sulfonium hydroxide, has been shown to be stable in aqueous solution elevated temperatures for days. Another exemplary salt, tris(dimethylamino)sulfonium chloride, does not decompose after about 81 hours at a temperature of about 89 degrees Celsius in a solution of about 1 molar alkali solution. Yet another exemplary salt, tris(dimethylamino)sulfonium tetrafluoroborate, has shown excellent electrochemical stability in the potential window of +/−2 volts vs. Ag/AgCl, which is a much larger potential window than what is required for any water based process (see: Becker et al., "New Organic Electrolytes: Tris(dialkylamino)sulfonium salts: $(R_2N)_3S^+X^-$," Journal of Electroanalytical Chem., vol. 248 (1988) pp. 363-368, incorporated by reference). In view of these observations, it is expected that polymers and compositions of this invention will be stable in alkaline media. For cases where enhanced stability is needed, salts and polymers may be designed with the intention of minimizing the types of degradation chemistry outlined in SCHEME 1 (vide supra). One degradation reaction that has been shown to occur for tris(piperidino)sulfonium hydroxide in nonaqueous media (tetrahydrofuran solution or vacuum-dried solid material, for example) is shown in the reaction of SCHEME 3 below.

SCHEME 3

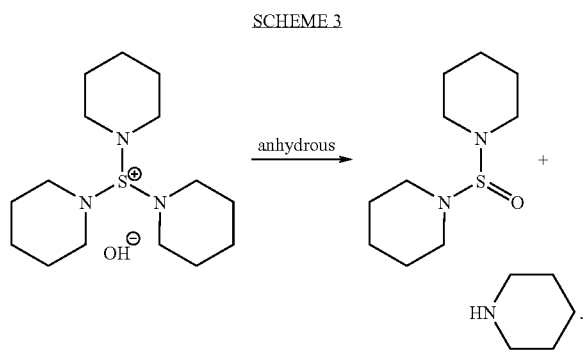

The reaction outlined in SCHEME 3 involves the attack at sulfur by the hydroxide. Chemical degradation by this pathway may be minimized by, for example, introducing chemical groups (alkyl groups, for example) into the compound at positions chosen to sterically shield the sulfur center in order to make it less accessible to hydroxide attack.

Another aspect of this invention is concerned with polymers that have phosphazene groups. Phosphazene groups useful with this invention are those where the phosphorus atom is bound to four nitrogen atoms. The neutral forms of these types of phosphazene groups are strong Lewis bases and are expected to undergo a chemical reaction with water to form phosphazenium cations and hydroxide, as shown in SCHEME 4 below.

SCHEME 4

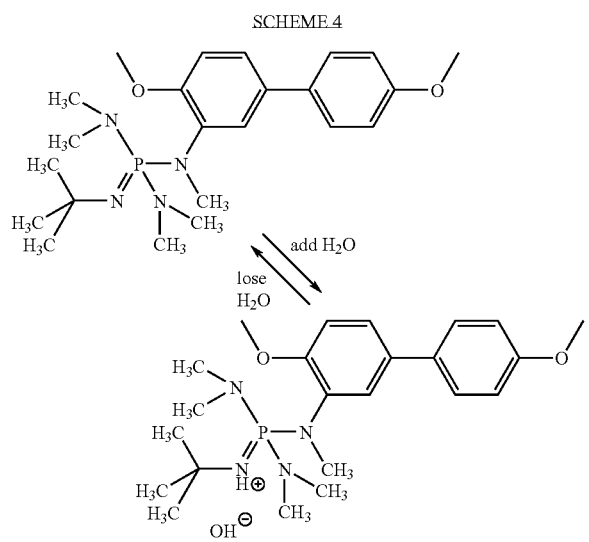

The polymer shown on the right is expected to be an ionic conductor and an anion exchange material. It should be noted that the reaction with water may be reversible. It has been reported that when only small amounts of water are present with representative compounds that include phosphazene, the neutral hydrate was formed (see: Hartmann et al., in "Crystal Chemistry of Uncharged Phosphazene Bases 0.1. Structures of Two Hydrates and an Acetate of Tris(dimethylamino)m-ethyliminophosphorane," Zeitsch rift fur Naturforschung Section B, 51b, 1996, 1369, and by Hartmann et al., "Crystal chemistry of uncharged phosphazene bases 0.2. Structures of the anhydrous form and two hydrates of the diphosphazene (Me(2)N)(3)P=N-(Me(2)N)(2)P=NH," Zeitschrift fur Naturforschung Section B, 51b, 1996, p. 1375). Thus, the ionic form shown on the right in SCHEME 4 is mostly present only when there is enough water to hydrate the hydroxide ion, which occurs when the stoichiometric ratio of water to phosphazene is about 2 or higher, and it is in materials of such a degree of hydration that ionic conductivity will be observed. According to the reversible reaction sketched in SCHEME 4, whenever hydroxide ions remove the most acidic proton from the phosphazenium cation, the product is the neutral phosphazene, which resists further reaction with hydroxide. This resistance against further reaction with hydroxide illustrates an aspect of "self-protection" against degradation reactions.

It is important to distinguish between the phosphazene moieties described herein, where each phosphorus atom is bonded to 4 nitrogen atoms and whose neutral forms are very strong Lewis bases, and other phosphazene and polyphosphazene moieties described in the art where phosphorus atoms are bonded to both nitrogen and oxygen atoms. Materials containing these latter moieties may be cationic conducting materials and are not pertinent to the present invention (see for example: Zhou et al., "High Temperature Transport Properties of Polyphosphazene Membranes for Direct Methanol Fuel Cells," Electrochim. Acta 48, 2003, p. 2173-2180).

Another aspect of this invention relates to polymeric structures comprising phosphazenes of the formula

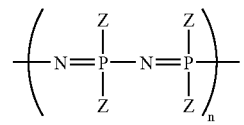

wherein n is any integer greater than 1; wherein Z is $NR_1R_2$ or $N(=PZ_3)$; and wherein $R_1$ and $R_2$ are independently selected from $C_1$ to $C_{10}$ alkyl, $C_1$ to $C_{10}$ partially fluorinated alkyl, or $C_1$ to $C_{10}$ fluorinated alkyl, and also wherein $R_1$ and $R_2$ may together form a $-(CH_2)_2-$, $-(CH_2)_3-$, $-(CH_2)_4-$, $-(CH_2)_5-$, $-CH=CH-$, or $-CH=CH-CH=CH-$. Such polymers may be synthesized by phosphazene condensation reactions similar to those reported by Schwesinger et al. in "Extremely Strong, Uncharged Auxiliary Bases; Monomeric and Polymer-Supported Polyaminophosphazenes (P-2-P-5)," Liebigs Annalen, (1996) vol. 7, p. 1055-1081. Again the phosphazene units, while neutral as shown in the above formula are expected to react with water when the material is sufficiently hydrated to form phosphazenium ions and hydroxide, and the resulting ionized material is expected to be an anionic conductor and an anion-exchange material.

Membranes of this invention may be used with fuel cells and water electrolyzers. Unlike the cation-exchange membranes used with acidic systems, the anion-exchange membranes of this invention may result in lower cell voltages for reactions involving oxygen. One advantage of using anion-exchange membranes instead of cation-exchange membranes relates to the use of non-noble metals instead of noble metals (nickel instead of platinum, for example) as catalysts for fuel cells, for example. This replacement would provide significant cost savings and perhaps system efficiency gains for electrolyzers and fuel cells.

In summary, the present invention is directed to polymers and compositions and anion-conducting membranes using these materials. Membranes of this invention are expected to be more robust than known anion-conducting membranes because they are less susceptible to degradation than current membranes are. It is expected that these membranes may be used in fuel cells, in membrane-based water electrolyzers, and in other chemical (anion-exchange resin, wastewater treatment, for example) and electrochemical processes (salt splitting, for example).

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A polymer of the formula

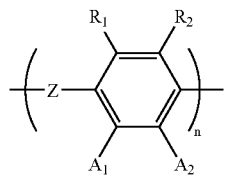

wherein n is an integer of 3 or greater; wherein Z is a direct bond or a chemical group independently selected from —O—, —S—, —$SO_2$—, —$C(CH_3)_2$—, —$C(CF_3)_2$—, —C(=O)—, —P(=O)(aryl)-, phenyl; wherein $R_1$ and $R_2$ independently of one another denote H, an alkyl, cycloalkyl, alkenyl, aryl, or aralkyl group having 1 to 10 carbon atoms or a heterocyclic group having 4 to 20 carbon atoms; wherein $R_1$ and $R_2$ together may form a —$(CH_2)_2$—, —$(CH_2)_3$—, —$(CH_2)_4$—, —$(CH_2)_5$—, —CH=CH—, or —CH=CH—CH=CH—; and wherein $A_1$ and $A_2$ are selected from hydrogen, alkyl, cycloalkyl, alkenyl, aryl, aralkyl group having 1 to 10 carbon atoms, a heterocyclic group having 4 to 20 carbon atoms, and a residue selected from those of the formula

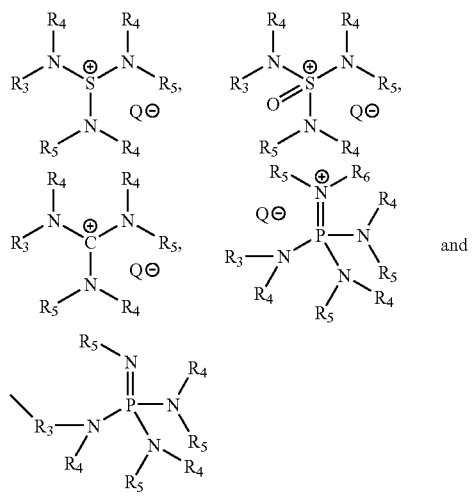

wherein $R_3$ is a direct bond or a group selected from —($CH_2CH_2$)—, —($C_6H_4$)—, —($CF_2CF_2$)—, —($CH_2CH_2CH_2$)—; wherein $R_4$ and $R_5$ independently of one another denote an alkyl, cycloalkyl, alkenyl, aryl, or aralkyl group having 1 to 10 carbon atoms or a heterocyclic group having 4 to 20 carbon atoms; wherein $R_4$ and $R_5$ may together form a —$(CH_2)_2$—, —$(CH_2)_3$—, —$(CH_2)_4$—, —$(CH_2)_5$—, —CH=CH—, or —CH=CH—CH=CH—; wherein $R_6$ is selected from H, alkyl or cycloalkyl; wherein Q is any anion; and with the caveat that the polymer comprises at least 1 weight percent of the residue.

2. An anion-conducting membrane comprising a polymer of the formula

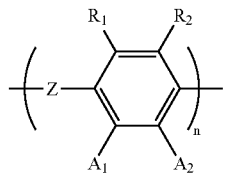

wherein n is an integer of 3 or greater; wherein Z is a direct bond or a chemical group independently selected from —O—, —S—, —$SO_2$—, —$C(CH_3)_2$—, —$C(CF_3)_2$—, —C(=O)—, —P(=O)(aryl)-, phenyl; wherein $R_1$ and $R_2$ independently of one another denote H, an alkyl, cycloalkyl, alkenyl, aryl, or aralkyl group having 1 to 10 carbon atoms or a heterocyclic group having 4 to 20 carbon atoms; wherein $R_1$ and $R_2$ together may form a —$(CH_2)_2$—, —$(CH_2)_3$—, —$(CH_2)_4$—, —$(CH_2)_5$—, —CH=CH—, or —CH=CH—CH=CH—; and wherein $A_1$ and $A_2$ are selected from hydrogen, alkyl, cycloalkyl, alkenyl, aryl, aralkyl group having 1 to 10 carbon atoms, a heterocyclic group having 4 to 20 carbon atoms, and a residue selected from those of the formula

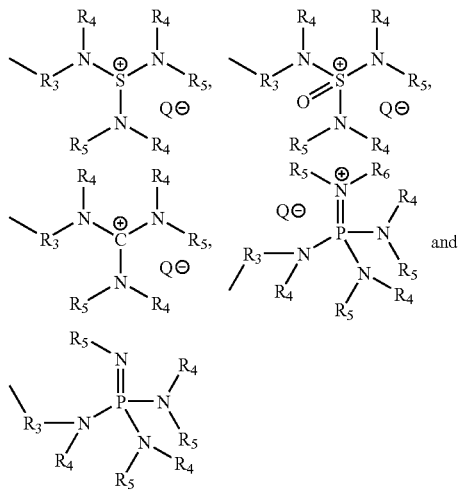

wherein $R_3$ is a direct bond or a group selected from —($CH_2CH_2$)—, —($C_6H_4$)—, —($CF_2CF_2$)—, —($CH_2CH_2CH_2$)—; wherein $R_4$ and $R_5$ independently of one another denote an alkyl, cycloalkyl, alkenyl, aryl, or aralkyl group having 1 to 10 carbon atoms or a heterocyclic group having 4 to 20 carbon atoms; wherein $R_4$ and $R_5$ may together form a —$(CH_2)_2$—, —$(CH_2)_3$—, —$(CH_2)_4$—, —$(CH_2)_5$—, —CH=CH—, or —CH=CH—CH=CH—; wherein $R_6$ is selected from H, alkyl or cycloalkyl; wherein Q is any anion; and with the caveat that the polymer comprises at least 1 weight percent of the residue.

3. The anion-conducting membrane of claim 2, wherein Q is an anion selected from the group consisting of hydroxide, carbonate, bicarbonate, and halide.

* * * * *